United States Patent Office 3,551,466
Patented Dec. 29, 1970

3,551,466
METAL SALTS OF REACTION PRODUCT OF AL-KENYL SUCCINIC ANHYDRIDE WITH A POLY-AMINE AND SALICYLALDEHYDE
Paul Y. C. Gee, Woodbury, and Harry J. Andress, Jr., Pitman, N.J., assignors to Mobil Oil Corporation, a corporation of New York
No Drawing. Original application Apr. 18, 1968, Ser. No. 722,153, now Patent No. 3,498,766, dated Mar. 3, 1970. Divided and this application Oct. 2, 1968, Ser. No. 798,495
Int. Cl. C07f 13/06, 13/00, 15/06
U.S. Cl. 260—429                    5 Claims

ABSTRACT OF THE DISCLOSURE

Liquid sydrocarbon compositions are provided which contain small amounts, sufficient to impart stabilizing properties, of metal salts of reaction products of alkenyl succinic acid anhydrides with a polyamine and salicylaldehyde, as stabilizers. A method for preparing these stabilizers is also provided.

CROSS-REFERENCE TO RELATED APPLICATIONS

This application is a division of our copending application Ser. No. 722,153, filed Apr. 18, 1968.

BACKGROUND OF THE INVENTION

(1) Field of the invention

This invention relates to improved liquid hydrocarbon compositions and, in one of its aspects, relates more particularly to liquid hydrocarbon compositions in the form of combustible fuels that are stabilized against screenclogging, sediment formation and oxidation, and to novel additive compositions intended to impart the aforementioned desirable stabilizing properties.

(2) Description of the prior art

As is well-known to those familiar with the art, liquid hydrocarbon compositions, particularly liquid hydrocarbon fuels, such as fuel oils, gasolines, jet fuels and diesel fuels, tend to exhibit certain deleterious characteristics, either after long periods of storage or under the conditions of operational use. Thus, for example, fuel oils have been found to be unstable in high temperature environments and to foul heat-exchange tubes and to cause clogging of screens and plugging of tubes. Sediment formation is another factor often encountered. In gasoline, for example, as well as in other fuel oils, oxidation and the effect of metal activity are also undesirable phenomena that are sought to be eliminated. Accordingly, a means for stabilizing such fuels and protecting them against screen clogging sediment formation, oxidation and metal activity, is highly desirable.

SUMMARY OF THE INVENTION

It has now been found, as more fully hereinafter described, that liquid hydrocarbon compositions can be provided possessing improved stabilizing properties, by incorporating therein a small amount, sufficient to impart such stabilizing properties, of the reaction product of one mole of an alkenyl succinic acid anhydride having at least 4 carbon atoms in the alkenyl group, one mole of a polyamine selected from the group consisting of ethylenediamine and propylenediamine, one mole of salicylaldehyde and a compound selected from the group consisting of metal hydroxides and metal alkoxides. As will become hereinafter apparent, these additive reaction products are particularly effective as anti-screen clogging agents, antioxidants and metal deactivators for such liquid hydrocarbon compositions as gasoline, jet fuels, diesel fuels and other fuel oils.

In accordance with the invention, these novel reaction product additives can be effectively employed in the liquid hydrocarbon compositions in an amount from about .001 to about 10 percent, preferably from about 0.01 to about 0.1 percent, by weight, of the total weight of the liquid hydrocarbon composition.

The liquid hydrocarbons improved in accordance with the present invention may comprise any hydrocarbons in which stability improvement is desirable. A field of specific applicability, in accordance with the present invention, is in the improvement of liquid hydrocarbons boiling at a temperature from about 75° F. to about 1000° F. Of particular importance is the treatment of petroleum distillate oils which have pour and flow points above about 75° F. and which boil as high as about 1000° F. or higher. It should be noted, in this respect, that the term "distillate oils" is not intended to be restricted to straight-run distillate fractions. The distillate oils can be straight-run distillate, catalytically or thermally cracked (including hydrocracked distillate oils) or mixtures of straight-run distillate oils, naphthas and the like, with cracked distillate stocks. Moreover, such oils can be treated in accordance with well known commercial methods, such as acid or caustic treatment, hydrogenation, solvent refining, clay treatment, and the like.

The distillate oils are characterized by their relatively low viscosity, pour point and the like. The principal property which characterizes these hydrocarbons, however, is their distillation range. As hereinbefore indicated, this range will preferably lie between about 75° F. and about 1000° F. Obviously, the distillation range of each individual oil will cover a narrow boiling range falling, nevertheless, within the above-mentioned limits. Likewise, each oil will boil substantially and continuously throughout its distillation range. Particularly contemplated among the fuel oils in addition to gasoline, are Nos. 1, 2, and 3 fuel oils used in heating and as diesel fuel oils, and the jet combustion fuels. The domestic fuel oils generally conform to the specifications set forth in A.S.T.M. Specification D396–48T. Specifications for disel fuels are defined in A.S.T.M. Specification D975–48T. Typical jet fuels are defined in Military Specification MIL–F–5624B.

In the novel additive compositions of the present invention, any alkenyl succinic acid anhydride, or the corresponding acid, is utilizable, in which the alkenyl group contains at least 4 carbon atoms. The alkenyl group can be straight-chain or branched-chain, and it can be saturated at the point of unsaturation by the addition of a substance which adds to olefinic double bonds such as hydrogen, sulfur, bromine, chlorine, or iodine. While it is obvious, of course, that the alkenyl group must contain at least 2 carbon atoms, it has, nevertheless, been found that unless this group contains at least 4 carbons atoms, the produced metal salt will not be soluble in the liquid hydrocarbon composition. It will be noted, however, that, in accordance with the present invention no upper limit is imposed with respect to the number of carbon atoms that may be present in this group. The alkenyl succinic acid anhydrides and the alkenyl succinic acids are interchangeable for the purposes of the present invention. Accordingly, when the term "alkenyl succinic acid anhydride," is used herein, it will be understood that this term embraces the alkenyl succinic acids as well as their anhydrides, and the derivatives thereof in which the olefinic double bond has been saturated, as previously indicated. Nonlimiting examples of the alkenyl succinic acid anhydride component include: butenyl succinic acid; 2-methylbutenyl succinic acid anhydride; 1,2- dichloropentyl succinic acid anhydride; hexenyl succinic acid anhydride; hexyl succinic acid; sulfurized 3-methylpentenyl succinic acid anhydride; 2,3 - dimethylbutenyl succinic acid anhydride; 3,3 - dimethylbutenyl succinic acid; 1,2 - dibromo-2-ethylbutyl succinic acid; heptenyl succinic acid anhydride; 1,2 - diiodooctyl succinic acid; octenyl succinic acid anhydride; diisobutenyl succinic acid anhydride; 2 - methylheptenyl succinic acid anhydride; 4 - ethylhexenyl succinic acid; 2 - isopropylpentenyl succinic acid anhydride; nonenyl succinic acid anhydride; 2 - propylhexenyl succinic anhydride; decenyl succinic acid; decenyl succinic acid anhydride; 5 - methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloroundecyl succinic acid; 3-ethyl-2-t-butylpentenyl succinic acid anhydride; tetrapropenyl succinic acid anhydride; tetrapropyenyl succinic acid; triisobutenyl succinic acid anhydride; 2-propyl-noneyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2 - dibromo-2-methylpentadecenyl succinic acid anhydride; 8 - propylpentadecyl succinic acid anhydride; eicosenyl succinic acid anhydride; 1,2-dichloro-2-methylnonadecenyl succinic acid anhydride; 2-octyldodecenyl succinic acid; 1,2-diiodotetracosenyl succinic acid anhydride; hexacosenyl succinic acid; hexacosenyl succinic acid anhydride; and hentriacontenyl succinic acid anhydride. In general, alkenyl succinic acid anhydrides having from about 8 to about 35, and preferably, from about 9 to about 18 carbon atoms in the alkenyl group thereof, are most advantageously employed in the novel additive compositions. Methods for preparing the alkenyl succinic acid anhydrides are well known to those familiar with the art, the most feasible method comprising the reaction of an olefin with maleic acid anhydride. A more detailed description of the alkenyl succinic acid anhydrides suitable for use in the additive compositions of the present invention and their preparation, is disclosed in Pat. No. 2,638,450, issued May 12, 1953.

As previously indicated, the novel additive reaction products of the present invention are obtained by the reaction of one mole of the alkenyl succinic acid anhydride; one mole of the polyamine, wihch is either ethylene diamine or propylenediamine; one mole of salicylaldehyde; and a compound which is either a metal hydroxide or a metal alkoxide. Insofar as these metal compouds are concerned, any metal hydroxide or metal alkoxide may be employed as the reactant. Preferably, metal hydroxides and metal alkoxides are employed in which the metal is calcium, barium, magnesium, sodium, zinc, cobalt or manganese. Obviously, there is no limitation imposed upon the amount of the metal compound employed for reaction thereof with the other reactants. Preferably, a slight excess of the metal hydroxide or metal alkoxide is preferred to insure complete reaction with the product produced by the aforementioned reaction of the alkenyl succinic acid anhydride, the polyamine and the salicylaldehyde. Insofar as the reaction conditions are concerned, the aforementioned reaction between the tetrapropenyl succinic acid anhydride, polyamine, salicylaldehyde, and metal hydroxide or metal alkoxide, can be conducted at temperatures as low as about 25° C. or as high as about 250° C. for promoting faster reaction. For most practcal operations, reaction temperatures from about 25° C. to about 175° C. are preferred.

In general, the aforemention metal salt reaction products are preferably prepared by gradually adding one mole of the polyamine to about room temperature with stirring to one mole alkenyl succinic acid anhydride, preferably diluted with a solvent, such as xylene, followed by the addition of one mole of salicylaldehyde. After the mixture has been heated under, e.g. xylene reflux (140–145° C.) until water has stopped coming over, the resulting mixture is then heated at a temperature from about 125° C. to about 175° C., for a period of 2 hours with the metal hydroxide or metal alkoxide, to form the corresponding metal salt. The following equations will serve to illustrate the formation of the above-described metal salts, in which one mole of tetrapropenylsuccinic acid anhydride is reacted with one mole of propylenediamine and one mole of salicylaldehyde; and in which a metal hydroxide or metal alkoxide is employed for producing the corresponding metal salt. In this stepwise illustration, R is tetrapropenyl.

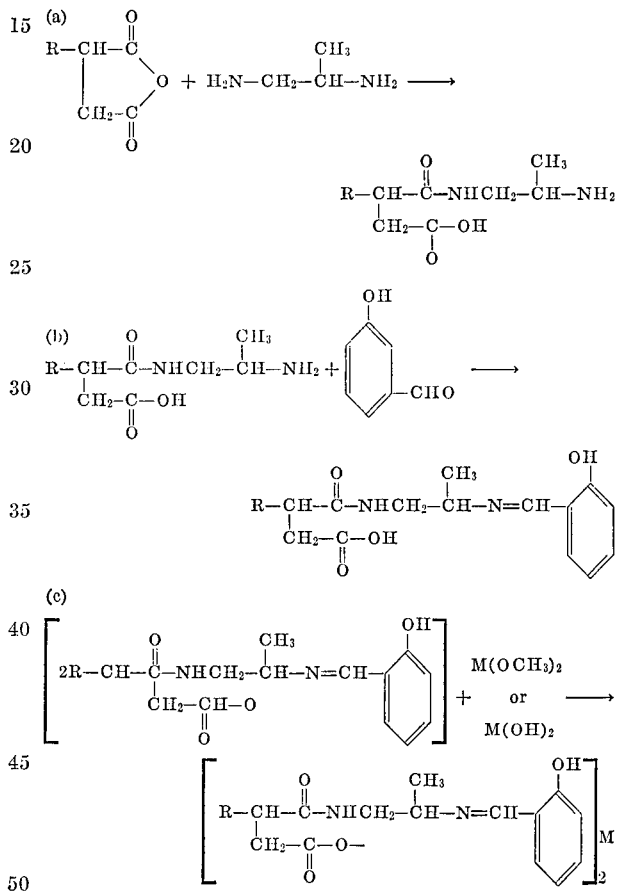

DESCRIPTION OF SPECIFIC EMBODIMENTS

The following data and examples will serve to illustrate the preparation of the novel metal salts of the present invention and their efficacy in imparting stabilizing properties to liquid hydrocarbon compositions. It will be understood, however, that it is not intended the invention be limited to the particular metal salts or the particular liquid hydrocarbon compositions described. Various modifications of these compositions, as previously indicated, can be employed and will be readily apparent to those skilled in the art.

EXAMPLE 1

37 gms. (0.5 mole) of propylenediamine were added gradually at room temperature with stirring to 133 gms. (0.5 mole) of tetrapropenylsuccinic anhydride previously diluted with 227 gms. of xylene followed by the addition of 61 gms. (0.5 mole) of salicylaldehyde. The mixture was gradually heated to reflux at 142° C. and was held there until water stopped coming over. To the reaction were added at room temperature with stirring 21.6 grams (0.25 mole) of magnesium methoxide in a methanol solution. The mixture was gradually heated to 140° C. and was held there until the methanol stopped coming over.

The final product, the magnesium salt of tetrapropenylsuccinic anhydride with propylenediamine and salicylaldehyde, which contained 50% xylene was clear and fluid at room temperature.

*Analysis.*—Estimated (percent): Mg, 1.40; N, 3.08. Found (percent): Mg, 1.52; N, 3.08.

EXAMPLE 2

37 gms. (0.5 mole) of propylenediamine were added gradually to 133 gms. (0.5 mole) of tetrapropenylsuccinic anhydride diluted with 256 gms. of xylene at room temperature with stirring followed by the addition of 61 gms. (0.5 mole) of salicylaldehyde. The mixture was gradually heated to reflux at 140° C. and was held there until water stopped coming over. To the above reaction mixture was added at room temperature with stirring 79 gms. (0.25 mole) of Ba(OH)$_2$·8H$_2$O previously mixed with 200 cc. of methanol. The mixture was gradually heated to 140–145° C. and was held there until the methanol and water stopped coming over. The final product, barium salt of tetrapropenylsuccinic anhydride with propylenediamine and salicylaldehyde, which contained approximately 50% xylene was clear and fluid at room temperature.

*Analysis.*—Estimated (percent): Ba, 6.90; N, 2.84. Found (percent): Ba, 7.28; N, 2.82.

EXAMPLE 3

37 gms. (0.5 mole) of propylenediamine were added gradually to 133 gms. (0.5 mole) of tetrapropenylsuccinic anhydride previously diluted with 231 gms. of xylene at room temperature with stirring followed by the addition of 61 gms. (0.5 mole) of salicylaldehyde. The mixture was gradually heated to 140° C. and was held there until water stopped coming over. To the reaction mixture was added at room temperature with stirring 0.25 mole of calcium methoxide, previously prepared by reacting 11.5 gms. (0.5 atomic weight) of sodium in the form of a sodium methoxide solution with 28 gms. (0.25 mole) of calcium chloride dissolved in 200 cc. of methanol. The mixture was gradually heated to 142° C. and was held there until the methanol stopped coming over. The reaction product was filtered through Hyflo clay to remove the sodium chloride. The final product, the calcium salt of tetrapropenylsuccinic anhydride with propylenediamine and salicylaldehyde, which contained approximately 50% xylene was dark green in color, clear and fluid at room temperature.

*Analysis.*—Estimated (percent): Ca, 2.22; N, 3.10. Found (percent): Ca, 2.22; N, 3.08.

EXAMPLE 4

37 gms. (0.5 mole) of propylenediamine were added gradually to 133 gms. (0.5 mole) of tetrapropenylsuccinic anhydride previously diluted with 238 gms. of xylene at room temperature with stirring followed by the addition of 61 gms. (0.5 mole) of salicylaldehyde. The mixture was gradually heated to reflux at 140° C., and was held there until water stopped coming over. To the reaction mixture was added at room temperature with stirring 0.25 mole of zinc methoxide in methanol solution obtained by reacting 11.5 gms. (0.5 atomic wt.) of sodium in the form of a sodium methoxide methanol solution with 36 gms. (0.5 mole+2 gms. excess) of zinc chloride dissolved in methanol. The mixture was gradually heated to 142° C. with stirring and was held there until the methanol stopped coming over. The reaction product was filtered through Hyflo clay. The final product, the zinc salt of tetrapropenylsuccinic anhydride with propylenediamine and salicylaldehyde, which contained approximately 50% xylene was clear and fluid at room temperature.

*Analysis.*—Estimated (percent): Zn, 3.46; N, 3.04. Found (perecnt): Zn, 3.76; N, 2.81.

EXAMPLE 5

37 gms. (0.5 mole) of propylenediamine were added gradually at room temperature with stirring to 133 gms. (0.5 mole) of tetrapropenylsuccinic anhydride diluted with 236 gms. of xylene followed by the addition of 61 gms. (0.5 mole) of salicylaldehyde. The mixture was gradually heated to reflux at 142° C. and was held there until water stopped coming over. To the reaction mixture was added at room temperature with stirring 0.25 mole of cobalt methoxide in methanol solution obtained by reacting 11.5 gms. (0.5 atomic weight) of sodium in the form of a methanol solution with 74 gms. (0.25 mole+25% excess) of cobalt chloride dissolved in methanol. The mixture was gradually heated to 142° C. and was held there until the methanol stopped coming over. The reaction product was filtered through Hyflo clay. The final product, the cobalt salt of tetrapropenylsuccinic anhydride with propylenediamine and salicylaldehyde, which contained approximately 50% xylene was dark brown in color, clear and fluid at room temperature.

*Analysis.*—Estimated (percent): Co, 3.10; N, 2.96. Found (percent): Co, 3.63; N, 3.17.

EXAMPLE 6

37 gms. (0.5 mole) of propylenediamine were added gradually at room temperature with stirring to 133 gms. (0.5 mole) of tetrapropenylsuccinic anhydride diluted with 235 gms. of xylene followed by the addition of 61 gms. (0.5 mole) of salicylaldehyde. The mixture was gradually heated to reflux at 140° C. and was held there until water stopped coming over. To the reaction mixture was added at room temperature with stirring 0.25 mole of manganese methoxide obtained by reacting 11.5 gms. (0.5 atomic weight) of sodium in the form of a sodium methoxide solution with 49.5 gms. (0.25 mole) of manganese chloride dissolved in methanol. The mixture was gradually heated to 142° C. and was held there until the methanol stopped coming over. The reaction product was filtered through Hyflo clay. The final product, the manganese salt of the tetrapropenylsuccinic anhydride with propylenediamine and salicylaldehyde, which contained 50% xylene was dark brown in color, clear and fluid at room temperature.

*Analysis.*—Estimated (percent): Mn, 2.93; N, 2.80. Found (percent): Mn, 2.46; N, 3.55.

EXAMPLE 7

15 gms. (0.25 mole) of ethylenediamine were gradually added at room temperature with stirring to 66.5 gms. (0.25 mole) of tetrapropenylsuccinic anhydride, diluted with 110 gms. of xylene, followed by the addition of 30.5 gms. (0.25 mole) of salicylaldehyde. The mixture was gradually heated to reflux at 142° C. and was held there until water stopped coming over. To the reaction mixture were added at room temperature with stirring 10.75 gms. (0.125 mole) of magnesium methoxide in a methanol solution. The mixture was gradually heated to 135° C. and was held there until all the methanol distilled over. The final product, the magnesium salt of tetrapropenylsuccinic anhydride with ethylenediamine and salicylaldehyde, contained approximately 50% xylene.

*Analysis.*—Estimated (percent): Mg, 1.35; N, 3.18. Found (percent): Mg, 1.60; N, 3.57.

EXAMPLE 8

15 gms. (0.25 mole) of ethylenediamine were gradually added at room temperature with stirring to 66.5 gms. (0.25 mole) of tetrapropenylsuccinic anhydride, diluted with 220 gms. of xylene, followed by the addition of 30.5 gms. (0.25 mole) of salicylaldehyde. The mixture was stirred at 95° C. for one hour. To the reaction mixture were added at room temperature with stirring 9.25 gms. (0.125 mole) of Ca(OH)$_2$ previously mixed with 100 cc. of methanol. The mixture was gradually heated to 135° C. and was held there until the methanol and water stopped coming over. The final product, the calcium salt of tetrapropenylsuccinic anhydride with ethylenediamine and salicylaldehyde, contained approximately 66⅔% xylene.

*Analysis.*—Estimated (percent): Ca, 1.48; N, 2.08. Found (percent): Ca, 1.84; N, 2.32.

EXAMPLE 9

47.25 gms. (0.25 mole) of tetraethylenepentamine were gradually added at room temperature with stirring to 66.5 gms. (0.25 mole) of tetrapropenylsuccinic anhydride, diluted with 143 gms. of xylene, followed by the addition of 30.5 gms. (0.25 mole) of salicylaldehyde. The mixture was gradually heated to reflux at 142° C. and was held there until water stopped coming over. To the reaction mixture were added at room temperature with stirring to 10.75 gms. (0.125 mole) of magnesium methoxide in a methanol solution. The mixture was gradually heated to 135° C. and was held there until the methanol stopped coming over. The final product, the magnesium salt of tetrapropenylsuccinic anhydride with tetraethylenepentamine and salicylaldehyde, contained approximately 50% xylene.

*Analysis.*—Estimated (percent): Mg, 1.1; N, 6.1. Found (percent): Mg, 1.26; N, 6.17.

EXAMPLE 10

47.25 gms. (0.25 mole) of tetraethylenepentamine were gradually added at room temperature with stirring to 66.5 gms. (0.25 mole) of tetrapropenylsuccinic anhydride, previously diluted with 286 gms. of xylene, followed by the addition of 30.5 gms. (0.25 mole) of salicylaldehyde. The mixture was stirred at 95° C. for one hour. To the reaction mixture were added at room temperature with stirring 9.25 gms. (0.125 mole) of Ca(OH)$_2$ previously mixed with 100 cc. of methanol. The mixture was gradually heated to 135° C. and was held there until the methanol and water stopped coming over. The final product, the calcium salt of tetrapropenylsuccinic anhydride with tetraethylenepentamine and salicylaldehyde, contained approximately 66⅔% xylene.

*Analysis.*—Estimated (percent): Ca, 1.17; N, 4.10. Found (percent): Ca, 1.35; N, 4.42.

EXAMPLE 11

18.5 gms. (0.25 mole) of propylenediamine were gradually added at room temperature with stirring to 52.5 gms. (0.25 mole) of octenylsuccinic anhydride, previously diluted with 200 gms. of xylene, followed by the addition of 30.5 gms. of salicylaldehyde. The mixture was gradually heated to reflux at 142° C. and was held there until water stopped coming over. To the reaction mixture were added at room temperature with stirring 10.75 gms. (0.125 mole) of magnesium methoxide in a methanol solution. The mixture was gradually heated to 135° C. and was held there until all the methanol distilled over. The final product, the magnesium salt of octenylsuccinic anhydride with propylenediamine and salicylaldehyde, contained approximately 66⅔% xylene.

*Analysis.*—Estimated (percent): Mg, 1.00; N, 2.12. Found (percent): Mg, 1.08; N, 2.60.

EXAMPLE 12

18.5 gms. (0.25 mole) of propylenediamine were gradually added at room temperature with stirring to 66.5 gms. (0.25 mole) of isooctadecenylsuccinic anhydride, previously diluted with 114 gms. of xylene, followed by the addition of 30.5 gms. (0.25 mole) of salicylaldehyde. The mixture was gradually heated to reflux at 142° C. and was held there until the water stopped coming over. To the reaction mixture were added at room temperature with stirring 10.75 gms. (0.125 mole) of magnesium methoxide in a methanol solution. The mixture was gradually heated to 135° C. and was held there until the methanol stopped coming over. The final product, the magnesium salt of isooctadecenylsuccinic anhydride with propylenediamine and salicylaldehyde, contained approximately 50% xylene.

*Analysis.*—Estimated (percent): Mg, 1.33; N, 3.10. Found (percent): Mg, 1.42; N, 3.27.

SCREEN CLOGGING

The anti-screen clogging characteristics of a fuel oil are determined as follows: the test is conducted using a Sunstrand V3 or S1 home fuel oil burner pump with a self-contained 100-mesh Monel metal screen. About 0.05%, by weight, of naturally-formed fuel oil sediment, composed of fuel oil, water, dirt, rust, and organic sludge is mixed with 10 liters of the fuel oil. The mixture is circulated by the pump through the screen for 6 hours. Then, the sludge deposit on the screen is washed off with normal pentane and filtered through a tared Gooch crucible. After drying, the material in the Gooch crucible is washed with a 50–50 (volume) acetone-methanol mixture. The total organic sediment is obtained by evaporating the pentane and the acetone-methanol filtrates. Drying and weighing the Gooch crucible yields the amount of inorganic sediment. The sum of the organic and inorganic deposits on the screen can be reported in milligrams recovered or converted into percent screen clogging.

The uninhibited test fuel oil was a blend of 60% distillate stock obtained from continuous catalytic cracking and 40% straight-run distillate stock, having a boiling range of, approximately, from about 320° F. to about 640° F., and representing a typical No. 2 fuel oil.

Blends of the additives of the examples were prepared in the aforedescribed test fuel oil and subjected to the screen clogging test. Results are set forth in Table I.

TABLE I.—SCREEN CLOGGING TESTS

| Inhibitors | Concentration, lb./1,000 bbls. | Screen clogging, percent |
|---|---|---|
| Uninhibited fuel blend | 0 | 100 |
| Uninhibited fuel blend plus Ex.: | | |
| 1 | 25 | 8 |
| 2 | 30 | 23 |
| 3 | 30 | 16 |
| 4 | 30 | 32 |
| 5 | 30 | 4 |
| 6 | 30 | 33 |
| Uninhibited fuel blend | 0 | 100 |
| Uninhibited fuel blend plus Ex.: | | |
| 7 | 30 | 1 |
| 8 | 30 | 4 |
| 9 | 30 | 11 |
| 10 | 30 | 51 |
| 11 | 30 | 72 |
| 12 | 30 | 2 |

NOTE: Inhibitors blended in a fuel oil blend comprising 60% catalytically cracked component and 40% straight run component, approximately 320-640° F. boiling range.

SEDIMENTATION

The test used to determine the sedimentation characteristics of the fuel oils is the 110° F. storage test. In this test, a 500-milliliter sample of the fuel oil under test is placed in a convected oven maintained at 110° F. for a period of 12 weeks. Then, the sample is removed from the oven and cooled. The cooled sample is filtered through a tared asbestos filter (Gooch crucible) to remove insoluble matter. The weight of such matter in milligrams is reported as the amount of sediment. A sample of the blank, uninhibited oil is run along with a fuel oil blend under test. The effectiveness of a fuel oil containing an inhibitor is determined by comparing the weight of sediment formed in the inhibited oil with that formed in the uninhibited oil.

Additives described in the examples were blended in the aforementioned test fuel oil and the blends were subjected to the 110° F. storage test. The test results comparing the blended fuels and uninhibited fuels are set forth in Table II.

TABLE II.—FUEL OIL STORAGE TEST

| Inhibitors | Concentration, lb./1,000 bbls. | Sediment, mg./liter |
|---|---|---|
| Uninhibited fuel blend | 0 | 18 |
| Uninhibited fuel blend plus Ex. 1 | 50 | 3 |
| Uninhibited fuel blend | 0 | 17 |
| Uninhibited fuel blend plus Ex. 3 | 15 | 7 |
| Uninhibited fuel blend | 0 | 19 |
| Uninhibited fuel blend plus Ex. 4 | 25 | 5 |

NOTE: Inhibitors blended in a fuel oil blend comprising 60% catalytically cracked component and 40% straight run component, approximately 320–640° F. boiling range.

GASOLINE STORAGE TEST

This test was used to determine the quantity of gum increase in both a gasoline blend comprising 100 percent catalytically cracked components and containing 3 cc. tetraethyl lead (TEL) per gallon, and boiling within a 100–400° F. boiling range, and the same gasoline blend containing, also, the additive compositions of the examples. After being maintained at 110° F. for a period of 16 weeks, the amount of gum increase was determined according to A.S.T.M. Test D381. The test results comparing the uninhibited gasolines and the same gasolines containing the additive compositions of the examples, are set forth in Table III.

TABLE III.—GASOLINE STORAGE TESTS

| Inhibitors | Concentration, lb./1,000 bbls. | ASTM gum (after 16 weeks at 110° F.), mg./100 ml. |
|---|---|---|
| Uninhibited gasoline plus 3 cc. TEL/gal | 0 | 7.0 |
| Uninhibited gasoline plus 3 cc. TEL/gal plus Ex. 1 | 5 | 3.2 |
| Uninhibited gasoline plus 3 cc. TEL/gal | 0 | 8.8 |
| Uninhibited gasoline plus 3 cc. TEL/gal plus Ex. 2 | 2 | 1.5 |
| Uninhibited gasoline plus 3 cc. TEL/gal | 0 | 8.8 |
| Uninhibited gasoline plus 3 cc. TEL/gal plus Ex. 3 | 5 | 2.0 |
| Uninhibited gasoline plus 3 cc. TEL/gal | 0 | 8.8 |
| Uninhibited gasoline plus 3 cc. TEL/gal plus Ex. 4 | 2 | 1.7 |

NOTE: Inhibitors blended in a gasoline blend comprising 100% catalytically cracked component, approximately 100–400° F. boiling range.

GASOLINE STORAGE TEST WITH COPPER

The same test procedure, as described in the Gasoline Storage Test (supra), was employed, with the same gasoline blends containing 3 cc. tetraethyl lead (TEL) per gallon, and also including 0.2 mg. copper naphthenate per liter, as a metal catalyst. The test results comparing the uninhibited gasolines and the same gasolines containing the additive compositions of the examples, are set forth in Table IV.

TABLE IV.—GASOLINE STORAGE TESTS WITH COPPER

| Inhibitors | Concentration, lb./1,000 bbls. | ASTM gum (after 16 week at 100° F.), mg./100 ml. |
|---|---|---|
| Uninhibited gasoline plus 3 cc. TEL/gal. plus 0.2 mg. Cu naphthenate/liter | 0 | 21.4 |
| Uninhibited gasoline plus 3 cc. TEL/gal. plus 0.2 mg. Cu naphthenate/liter plus Ex. 1 | 5 | 2.4 |
| Uninhibited gasoline plus 3 cc. TEL/gal. plus 0.2 mg. Cu naphthenate/liter | 0 | 23.0 |
| Uninhibited gasoline plus 3 cc. TEL/gal. plus 0.2 mg. Cu naphthenate/liter plus Ex. 2 | 10 | 5.5 |
| Uninhibited gasoline plus 3 cc. TEL/gal. plus 0.2 mg. Cu naphthenate/liter | 0 | 23.0 |
| Uninhibited gasoline plus 3 cc. TEL/gal. plus 0.2 mg. Cu naphthenate/liter plus Ex. 3 | 10 | 4.2 |
| Uninhibited gasoline plus 3 cc. TEL/gal. plus 0.2 mg. Cu naphthenate/liter | 0 | 23.0 |
| Uninhibited gasoline plus 3 cc. TEL/gal. plus 0.2 mg. Cu naphthenate/liter plus Ex. 4 | 10 | 5.3 |

NOTE: nInhibitors blended in a gasoline blend comprising 100% catalytically cracked component approximately 100–400° F. boiling rage.

COPPER ACCELERATED STORAGE TEST

The test procedure as described in the Gasoline Storage Tests with Copper (supra), was employed, in which the inhibitors were incorporated in a hydrofined fuel oil blend comprising 60% catalytically cracked component and 40% straight run component, falling approximately within the range of 310°–650° F. In this test, the fuel oil blends are contacted with a polished copper strip for 48 hours at 880° F. and then evaluated in a storage test run at 205° F. for a period of 48 hours. The test results comparing the uninhibited fuel and the same fuel containing additive compositions of the examples, are set forth in Table V.

TABLE V.—COPPER ACCELERATED STORAGE TEST

| Inhibitors | Concentration, lb./1,000 bbls. | Sediment, mg./liter |
|---|---|---|
| Uninhibited fuel blend | 0 | 1,581.0 |
| Uninhibited fuel blend plus Ex.: | | |
| 1 | 10 | 13.2 |
| 2 | 10 | 22.6 |
| 3 | 10 | 9.6 |
| Uninhibited fuel blend | 0 | 416 |
| Uninhibited fuel blend plus Ex.: | | |
| 7 | 20 | 1.6 |
| 8 | 20 | 3.4 |
| 9 | 20 | 15.2 |
| 10 | 20 | 27.6 |
| 11 | 20 | 3.2 |
| 12 | 20 | 2.4 |

NOTE: Inhibitors blended in a hydrofined fuel oil blend comprising 60% catalytically cracked component and 40% straight run component approximately 310–650° F. boiling range.

From the foregoing comparative data, it will be apparent that the novel metal salts of the present invention are highly effective as stabilizers for liquid hydrocarbon compositions. Although the present invention has been described with preferred embodiments, it will be understood that various modifications and adaptations thereof may be resorted to without departing from the spirit and scope of the invention and that the liquid hydrocarbon compositions therein disclosed may contain other additive materials intended to enhance their properties.

We claim:

1. The reaction product of one mole of an alkenyl succinic acid or anhydride having from about 4 to about 35 carbon atoms in the alkenyl group, one mole of a polyamine selected from the group consisting of ethylenediamine and propylenediamine and one mole of salicylaldehyde, and reacting said product with a compound selected from the group consisting of monovalent and divalent metal hydroxides and metal alkoxides.

2. The reaction product, as defined in claim 1 wherein the alkenyl succinic acid anhydride comprises tetrapropenyl succinic anhydride and the metal of said metal hydroxide and metal alkoxide is selected from the group consisting of calcium, barium, magnesium, sodium, zinc, cobalt, and manganese.

3. The method for preparing a reaction product as defined in claim 1 which comprises reacting one mole of an alkenyl succinic acid or anhydride having from about 4 to about 35 carbon atoms in the alkenyl group, one mole of a polyamine selected from the group consisting of ethylenediamine and propylenediamine and one mole of salicylaldehyde, and reacting said product with a compound selected from the group consisting of monovalent and divalent metal hydroxides and metal alkoxides.

4. The method of claim 3 wherein said reaction is carried out at a temperature from about 25° C. to about 250° C.

5. The method of claim 3 wherein said reaction is carried out at a temperature from about 25° C. to about 175° C.

References Cited

UNITED STATES PATENTS

| | | | |
|---|---|---|---|
| 2,742,498 | 4/1956 | Smith et al. | 260—518 |
| 3,296,130 | 1/1967 | Gee et al. | 252—336 |
| 3,306,908 | 2/1967 | Le Suer | 260—326.3 |

TOBIAS E. LEVOW, Primary Examiner

A. P. DEMERS, Assistant Examiner

U.S. Cl. X.R.

260—429.9, 439, 521

PO-1050
(5/69)

UNITED STATES PATENT OFFICE
CERTIFICATE OF CORRECTION

Patent No. 3,551,466      Dated December 29, 1970

Inventor(s) PAUL Y. C. GEE and HARRY J. ANDRESS, JR.

It is certified that error appears in the above-identified patent and that said Letters Patent are hereby corrected as shown below:

```
Column 1, line 16  -  for "sydrocarbon" read --hydrocarbon--
Column 2, line 43  -  for "disel" read --deisel--
Column 3, line 46  -  for "wihch" read --which--
Column 3, line 67  -  for "practcal" read --practical--
Column 3, line 69  -  for "aforemention" read --aforementio
Column 3, line 72  -  for "to" read --at--
```

Column 4, diagram (c)

$$\text{for} - \left[ 2R-CH-\underset{\underset{CH_2-CH-O}{|}}{\overset{\overset{O}{\|}}{C}}-NHCH_2-\overset{\overset{CH_3}{|}}{CH}-N=CH..... \right]$$

$$\text{read} -- 2\left[ R-CH-\underset{\underset{CH_2-C-OH}{|}}{\overset{\overset{O}{\|}}{C}}-NHCH_2-\overset{\overset{CH_3}{|}}{CH}-N=CH...... \right] --$$

```
Column 5, line 71      -  for "perecnt" read --percent--
Column 8, Table I
  3rd subtitle         -  for "Screeen" read --Screen--
Column 9, Table IV
  foodnote             -  for "nInhibitors" read --Inhibitors--
Column 9, Table IV
  3rd subtitle
  3rd line             -  for "100°F)," read --110°F),--
Column 9, line 74      -  for "880°F." read --80°F.--
```

Signed and sealed this 25th day of May 1971.

(SEAL)
Attest:

EDWARD M. FLETCHER, JR.
Attesting Officer

WILLIAM E. SCHUYLER, JR.
Commissioner of Patents